United States Patent [19]

Kobrin

[11] 4,303,308

[45] Dec. 1, 1981

[54] REAR VIEW MIRROR

[76] Inventor: Hy H. Kobrin, 6840 NW. 10th Dr., Margate, Fla. 33309

[21] Appl. No.: 125,145

[22] Filed: Feb. 27, 1980

[51] Int. Cl.³ .......................... B60R 1/08; G02B 5/10
[52] U.S. Cl. ..................................... 350/303; 350/293
[58] Field of Search ................................ 350/293, 303

[56] References Cited

U.S. PATENT DOCUMENTS

| | | | |
|---|---|---|---|
| 3,170,985 | 2/1965 | Katulich | 350/293 |
| 3,175,463 | 3/1965 | Seashore | 350/303 X |
| 3,389,952 | 6/1968 | Tobin, Jr. | 350/303 |
| 3,408,136 | 10/1968 | Travis | 350/293 |
| 3,563,638 | 2/1971 | Panozzo | 350/293 |
| 3,797,920 | 3/1974 | Beach, Jr. | 350/303 |
| 4,029,399 | 6/1977 | Haile | 350/303 |
| 4,105,295 | 8/1978 | Skilliter, Jr. | 350/303 |

FOREIGN PATENT DOCUMENTS

| | | | |
|---|---|---|---|
| 562110 | 5/1975 | Switzerland | 350/303 |
| 1133005 | 11/1968 | United Kingdom | 350/293 |

*Primary Examiner*—F. L. Evans
*Attorney, Agent, or Firm*—Arthur W. Fisher, III

[57] ABSTRACT

A rear view mirror having a planar mirror means and a convex mirror means disposed in angular disposition relative thereto. The convex mirror means has one end substantially co-planar with the plane of the planar mirror means and its other end, due to the angular orientation of the convex mirror, is spaced apart from the plane of the planar mirror. The spaced apart end of the convex mirror is disposed near to the vehicle driver and the substantially co-planar end is therefore disposed remote from the driver. The housing for the convex mirror has tabs approximately equal to the thickness of the planar mirror so that said tabs and the opposed longitudinal edges of the planar mirror means can be slidingly received within predetermined ones of a pair of transversely opposed co-planar channel defining members that together, with interconnecting end plates, collectively define the housing means for both the planar mirror means and the convex mirror means.

8 Claims, 6 Drawing Figures

REAR VIEW MIRROR

BACKGROUND OF THE INVENTION

1. Field of the Invention

This invention relates generally to rear view mirrors, more specifically to rear view mirrors incorporating more than one type of mirror and particularly to a mirror assembly having a planar mirror unit and a convex mirror unit disposed in angular relation to the plane of said planar mirror unit.

2. Description of the Prior Art

Rear view mirrors of the prior art have not eliminated the well known "blind spot" that presents a safety hazard to the operators of motor vehicles. Typical of the prior art attempts to eliminate the blind spot are mirror assemblies having a parabolic type mirror adhered to a planar mirror. Unfortunately, when the planar mirror is correctly positioned to afford to the vehicle driver an optimal view of the side of his vehicle and the roadway adjacent thereto, the parabolic mirror will reflect primarily the side of the vehicle itself and will reflect only a minmal portion of the roadway sought to be visually monitored. Thus, too much of the wrong information is visually supplied to the driver and too little of the correct information is supplied to the driver. Accordingly, there is seen to be a need in the rear view mirror industry for a mirror that will optimally reflect the roadway adjacent the side of a vehicle while minimizing reflection of the side of the vehicle itself.

SUMMARY OF THE INVENTION

Such a device is now provided in a construction comprising a planar mirror and a convex mirror means disposed in angular orientation relative thereto. The angularly disposed convex mirror diverges upwardly from the planar mirror so that one end of the convex mirror lies substantially co-planar with the plane of the planar mirror while the other end of the convex mirror is spaced apart from the plane of the planar mirror. The spaced apart end of the convex mirror is disposed proximate to the driver and the co-planar portion of the convex mirror is therefore disposed remote from the driver.

It is therefore seen to be an important object of this invention to provide a rear view mirror that provides optimal visual information to the driver of a vehicle. A closely related object is to provide a compound mirror assembly, wherein one mirror comprises a planar-in-configuration mirror and the other mirror, disposed adjacent thereto, comprises a convex mirror. Still another object is to provide an asssembly for retaining both the planar mirror and the convex mirror in optimal disposition so that either mirror can be replaced if damaged by simply disassembling the mirror housing, replacing the damaged mirror only, and reassembling the housing.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
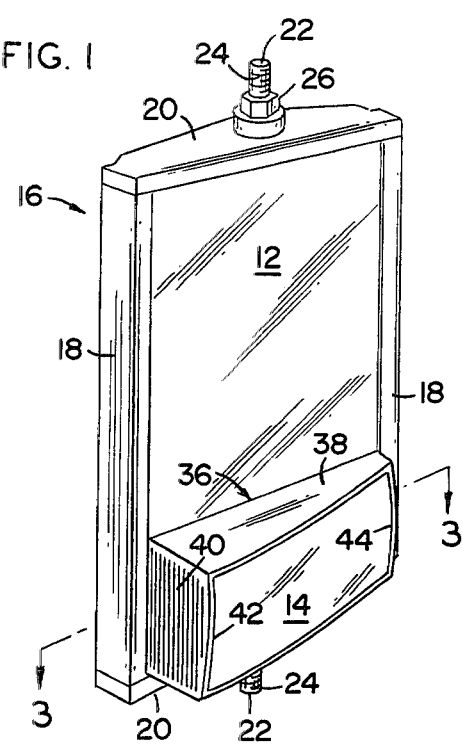
FIG. 1 is a perspective view of the preferred embodiment of the invention.

FIG. 1 shows the preferred relative disposition of the planar mirror means 12 and the convex mirror means 14, i.e., the planar mirror is preferably disposed upwardly of the convex mirror.

The housing, generally designated 16, for supporting engagement of the two mirror means is collectively defined by a pair of co-planar transversely opposed, parallel channel defining members 18 interconnected at opposite ends thereof by end plates 20.

End plates 20 are interconnected by a rod 22 having threaded portions 24 at its opposing ends. A pair of nut means 26 are complementally threaded so that tightening of either or both of the nut means 26 imparts a compressive force upon the housing 16 thereby securing the housing assembly.

Figure 2:
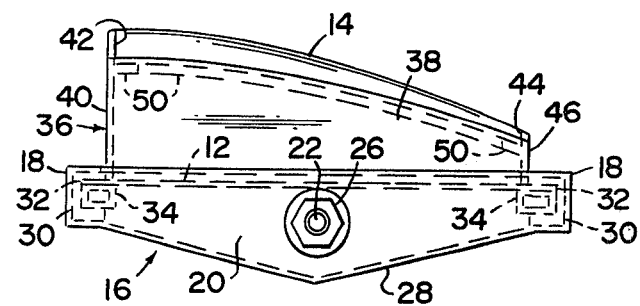
FIG. 2 is a bottom plan view of the preferred embodiment.
Figure 3:
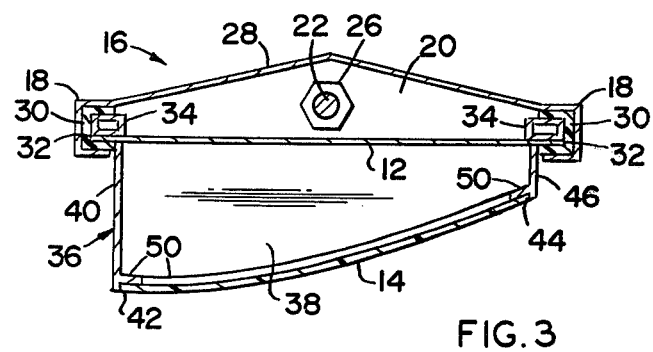
FIG. 3 is a transverse sectional view taken along line 3—3 of FIG. 1.
Figure 4:
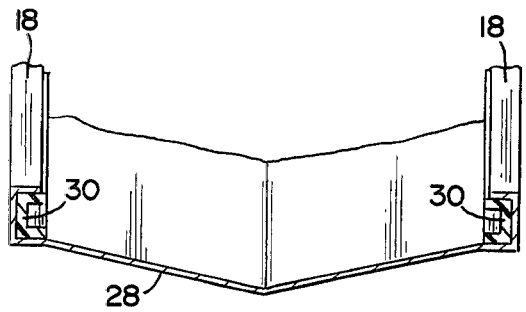
FIG. 4 is a fragmentary perspective view of the mirror housing.
Figure 5:
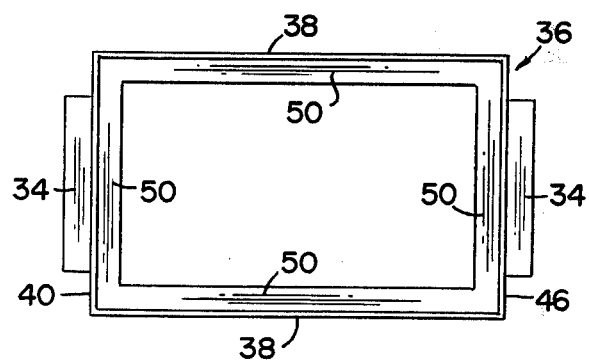
FIG. 5 is a top plan view of the convex mirror housing.
Figure 6:
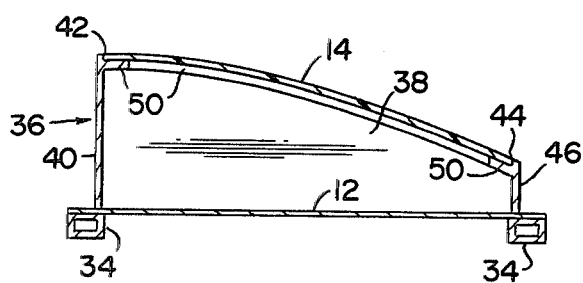
FIG. 6 is a side elevation view of the convex mirror housing.

The rod means 22 is disposed rearwardly of the planar mirror 12 to accommodate the rod 22. Therefore, the back panel 28 of the housing assembly 16 is V-shaped in plan view as best seen in FIGS. 3 and 4. Each end plate 20 therefore is complementally formed respective to the V-shaped back panel as best seen in FIGS. 1-3. Thus, the opposing threaded ends 24 of the rod means 22 protrude through the end plates 20 substantially centrally thereof. The V-shape further decreases wind resistance and diffuses sunlight reflecting from the back panel 28 for safety purposes.

Nested within the channel defining members 18 are a pair of corresponding vinyl members 30 adaped to slidingly receive therein the opposed longitudinal edges 32 of the planar mirror means and the tab means, collectively designated 34, associated with the convex mirror housing, generally designated 36. To assemble this illustrative embodiment of the invention, channel defining members 18, having vinyl channel members 30 nested therein, are disposed at right angles to opposite ends of one end plate 20 and rod means 22 is disposed in its operative configuration. The opposed longitudinal edges of the planar mirror means are then slid into the vinyl channel means 30. The opposite ones of the tab means 34 of the convex mirror housing 36 are then slid into the same vinyl channel members 30 and the other end plate 20 is then operatively disposed so that one end of the rod means 22 protrudes centrally therethrough. Tightening the associated nut 26 imparts compressive forces upon the collective housing assembly 16 and completes the assembly of the invention. The threaded portion 24 of the rod means 22 protruding beyond each nut means 26 provides means for mounting the assembled novel mirror means to a vehicle (not shown).

The convex mirror housin 36 has a generally rectangular configuration, in plan view. A pair of tapered side walls 38 define the specific angular disposition of the convex mirror 14 relative to the plane of the planar member 12. Accordingly, convex mirror housing end wall 40 is disposed orthogonally to one of the side walls 38 and extends in height from the plane of the planar mirror 12 to the highest edge of the convex mirror as at 42 of the tapered side walls 38. This high side of the convex mirror 14 is disposed proximate to the driver of the vehicle when the inventive assembly is installed. Accordingly, the lower side of the convex mirror as at 44 is nearly co-planar with the plane of the planar mirror 12. Thus, end wall 46 is essentially a side wall interconnecting strut.

The lowermost portion of each end wall 40, 46 is contiguous to an associated tab means 34, mentioned earlier, said tab means 34 adapted for slide fit engagement within the vinyl channel members 30 nested within channel defining members 18 as aforesaid.

A plurality of inwardly directed tab or flange means 48 is formed adjacent the uppermost edge of the tapered side walls 38, and of the end walls 46. Spaced downwardly from the peripheral tabs 48 a distance approximately equal to the thickness of the planar mirror 12 and the thickness of the tab means 34 associated with the convex mirror housing 36, are a plurality of inwardly directed convex mirror support shelves collectively designated 50. The convex mirror 14 is thus held in sandwiched relation between the inwardly directed tab means 48 and the inwardly directed shelf means 50.

It should now be apparent that the inventive mirror assembly can be operatively disposed on either the left or right side of the vehicle, as long as the outwardly projecting portion 42 of the convex mirror 14 is disposed proximate to the driver. Thus if it is desired to move the novel mirror from the left to the right side of the vehicle, the convex mirror 14 need merely be rotated 180°.

It will thus be seen that the objects set forth above, and those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described, what is claimed is:

1. A rear view mirror assembly, comprising: a planar mirror means of predetermined dimensions, a convex mirror means disposed in angular orientation relative to said planar mirror means so that one end of said convex mirror means is substantially co-planar with the plane of said planar mirror means, said end disposed remotely from a driver of a vehicle and so that said convex mirror means diverges outwardly from the plane of the planar mirror means as said convex mirror means extends to a position proximate to the driver of the vehicle, said planar mirror means and said convex mirror means disposed adjacent one another so that the driver of the vehicle can observe both mirrors substantially simultaneously, a convex mirror housing means for retaining said convex mirror means in said angular disposition, said convex mirror housing means comprisisng a generally rectangular housing means having opposed tapered side walls and a pair of opposed end walls orthogonally disposed relative to said side walls for interconnecting the opposed ends of said tapered side walls; the amount of taper of said side walls defining the specific angular orientation of said convex mirror means relative to the plane of said planar mirror means, said convex mirror housing means further comprises an inwardly directed peripheral flange means formed in the outer edges of said tapered side walls and a plurality of circumferentially spaced inwardly directed shelf means for supporting the peripheral edges of said convex mirror means, said flange and said shelf means collectively retaining said convex mirror means in sandwiched relation therebetween, said convex mirror housing further comprises a pair of opposed outwardly projecting tab means disposed adjacent said end walls to secure said convex mirror housing assembly in said rear, view mirror assembly.

2. The mirror assembly of claim 1, further comprising housing means for retaining said planar mirror means, said housing means collectively defined by a pair of co-planar transversely spaced apart channel defining members adapted to slidingly receive therein opposed longitudinal edges of said planar mirror means and by a pair of opposed end plates for interconnecting said channel defining members, and means for imparting compressive forces to said collective assembly of channel defining members and end plates to retain the same in their assembled configuration.

3. The mirror assembly of claim 2 wherein said means for imparting compressive forces to said assembly comprises an elongate rod means interconnecting said end plate means, opposite ends of said rod means threaded to engage complementally threaded tightening means so that tightening of said tightening means urges said end plates to converge toward one another, thereby imparting compressive forces to said channel defining members.

4. The mirror assembly of claim 3 wherein said rod means is disposed rearwardly of said planar mirror means, said housing for said planar mirror means further comprising a back panel, said back panel of generally V-shaped configuration to accommodate said rod means.

5. The mirror assembly of claim 4, said planar mirror means having a length dimension less than the length dimension of said channel defining members so that said channel defining members slidingly receive said planar mirror means and said convex mirror means by slidingly receiving the opposed longitudinal edges of the planar mirror means and by slidingly receiving the tab means associated with the convex mirror means housing.

6. The mirror assembly of claim 5, said channel defining members further comprising complementally formed cushion members formed of a resilient material for slidingly gripping the opposed longitudinal edges of said planar mirror means and the opposed tab means of said convex mirror means.

7. The mirror assembly of claim 6, wherein said resilient material is vinyl.

8. A rear view mirror assembly, comprising: a planar mirror means of predetermined dimensions, a convex mirror means disposed in angular orientation relative to said planar mirror means so that one end of said convex mirror means is substantially co-planar with the plane of said planar mirror means, said end disposed remotely from a driver of a vehicle and so that said convex mirror means diverges outwardly from the plane of the planar mirror means as said convex mirror means extends to a position proximate to the driver of the vehicle, said planar mirror means and said convex mirror means disposed adjacent one another so that the driver of the vehcile can observe both mirrors substantially simultaneously, a covex mirror housing means for retaining said convex mirror means in said angular disposition, said convex mirror housing means comprising a generally rectangular housing means having opposed tapered side walls and a pair of opposed end walls orthogonally disposed relative to said side walls for interconnecting the opposed ends of said tapered side walls; the amount of taper of said side walls defining the specific angular orientation of said convex mirror means relative to the plane of said planar mirror means, said convex mirror housing means further comprises a plurality of circumferentially spaced inwardly directed for supporting the peripheral edges of said convex mirror means, said convex mirror housing further comprises a pair of opposed outwardly projecting tab means disposed adjacent the lowermost portion of said end walls to secure said convex mirror housing assembly in said rear view mirror assembly, and further comprising a housing means for retaining said planar mirror means and said convex mirror housing, said housing means collectively defined by a pair of co-planar transversely spaced apart channel defining members, so that said channel defining members slidingly receive said planar mirror means and said convex mirror means by slidingly receiving the opposed longitudinal edges of the planar mirror means and by slidingly receiving said tab means associated with the convex mirror means housing, and by a pair of opposed end plates for interconnecting said channel defining members, and means for imparting compressive forces to said collective assembly of channel defining members and end plates to retain the same in their assembled configuration

* * * * *